(12) United States Patent
Verbist et al.

(10) Patent No.: US 8,323,395 B2
(45) Date of Patent: Dec. 4, 2012

(54) SULPHUR CEMENT PRE-COMPOSITION AND PROCESS FOR PREPARING SUCH SULPHUR CEMENT PRE-COMPOSITION

(75) Inventors: Guy Lode Magda Maria Verbist, Amsterdam (NL); Rob Aloysius Maria Van Trier, Eindhoven (NL); Michael David Lankshear, Amsterdam (NL)

(73) Assignee: Shell Oil Company, Houston, TX (US)

( * ) Notice: Subject to any disclaimer, the term of this patent is extended or adjusted under 35 U.S.C. 154(b) by 396 days.

(21) Appl. No.: 12/663,989

(22) PCT Filed: Jun. 11, 2008

(86) PCT No.: PCT/EP2008/057277
§ 371 (c)(1),
(2), (4) Date: Apr. 5, 2010

(87) PCT Pub. No.: WO2008/152054
PCT Pub. Date: Dec. 18, 2008

(65) Prior Publication Data
US 2010/0192810 A1 Aug. 5, 2010

(30) Foreign Application Priority Data

Jun. 13, 2007 (EP) .................................. 07110154

(51) Int. Cl.
*C04B 28/00* (2006.01)
(52) U.S. Cl. ................................. 106/287.19; 106/273.1
(58) Field of Classification Search ................ 106/273.1, 106/287.19
See application file for complete search history.

(56) References Cited

U.S. PATENT DOCUMENTS

| 3,674,525 | A | * | 7/1972 | Louthan | 106/287.1 |
| 3,965,067 | A | | 6/1976 | Jin | 260/45.8 A |
| 4,164,428 | A | | 8/1979 | Simic | 106/287.13 |
| 4,293,463 | A | | 10/1981 | Vroom | 260/42.24 |
| 4,376,830 | A | | 3/1983 | Nimer et al. | 501/140 |
| 4,623,738 | A | | 11/1986 | Sugerman et al. | 556/17 |

FOREIGN PATENT DOCUMENTS

| FR | 2573420 | 5/1986 |
| JP | 10114565 | 5/1998 |
| WO | WO2007065920 | 6/2007 |
| WO | WO2008152054 | 12/2008 |

OTHER PUBLICATIONS

INCONEL® Alloy 718, www.specialmetals.com, Sep. 2007, pp. 1-28.
International Search Report dated Sep. 8, 2008 International Application No. PCT/EP2008/057277.

* cited by examiner

*Primary Examiner* — David M Brunsman
(74) *Attorney, Agent, or Firm* — Charles W. Stewart

(57) ABSTRACT

The present invention provides a sulphur cement pre-composition, comprising sulphur and at least an organotitanate, which organotitanate is of the general molecular formula (1): wherein R1 is $C_nH_{(2n)}$—$S_aR_4$ or $C_mH_{(2m+1)}$ and n is an integer in the range of from 1 to 4, m is an integer in the range of from 1 to 30 and a is an integer in the range of from 2 to 8, R4 is S, H, or $C_pH_{(2p+1)}$ and p is an integer in the range of from 1 to 8, XO is an alkoxy or neoalkoxy group, R2 and R3 are, independently, a $C_nH_{(2n)}$—$S_aR_4$, alkyl, neoalkyl, acyl or aryl group. The invention further provides a process for preparing such sulphur cement pre-composition, processes for the preparation of a sulphur cement product, a sulphur cement product and the use of such sulphur cement pre-composition. The invention even further relates to the use of an organotitanate stabilizing agent.

18 Claims, No Drawings

SULPHUR CEMENT PRE-COMPOSITION AND PROCESS FOR PREPARING SUCH SULPHUR CEMENT PRE-COMPOSITION

This application is a 371 filing of PCT/EP08/57277, filed Jun. 11, 2008.

The present application claims priority from European Patent Application 07110154.7 filed 13 Jun. 2007

FIELD OF THE INVENTION

The present invention provides a sulphur cement pre-composition and a process for the preparation of a sulphur cement pre-composition. The invention further provides processes for the preparation of a sulphur cement product, a sulphur cement product and the use of such sulphur cement pre-composition in sulphur cement sulphur mortar or sulphur concrete.

BACKGROUND OF THE INVENTION

Sulphur cement generally refers to a product comprising at least sulphur and a filler. To improve the properties of the sulphur cement, the sulphur may be modified using a sulphur modifier. Such modifiers are known in the art.

Usual sulphur cement fillers are particulate inorganic materials.

Sulphur cement-aggregate composites generally refer to a composite comprising both sulphur cement and aggregate. Examples of sulphur cement-aggregate composites are sulphur mortar, sulphur concrete and sulphur-extended asphalt. Sulphur-extended asphalt is asphalt, i.e. typically aggregate with a binder that contains filler and a residual hydrocarbon fraction, wherein part of the binder has been replaced by sulphur, usually modified sulphur.

It is known to use organosilane compounds as a stabilising agent in sulphur cement or sulphur cement-aggregate compositions to improve water stability. In U.S. Pat. No. 4,164,428 for example, a modified sulphur composition (often referred to a plasticized sulphur composition) comprising at least 50% by weight of sulphur, a sulphur modifier (often referred to a sulphur plasticizer), a finely divided particulate mineral suspending agent, and an organosilane stabilising agent is disclosed. It is mentioned that suitable organosilanes have the general molecular formula R—Si(OR')$_3$, wherein R' is a low molecular weight alkyl group and R is an organic radical having at least one functional group, usually bonded to the silicon atom by a short alkyl chain. Gamma-mercaptopropyltrimethoxysilane is mentioned as a preferred organosilane.

In U.S. Pat. No. 4,376,830 a sulphur cement-aggregate composition comprising a sulphur cement and an aggregate containing an expansive clay and processes for preparing such compositions are disclosed. The processes, and resulting compositions, are characterised by the addition of certain organosilane compounds in the composition prior to solidifying (cooling) the composition. It is mentioned that suitable organosilanes have the formula Z—Si(R$^1$R$^2$R$^3$), wherein R$^1$, R$^2$ and R$^3$ may be lower alkoxy groups and Z is an organic radical attached to Si via a carbon atom and has at least one molten-sulphur reactive group. Z may for example be mercaptoalkyl. Gamma-mercaptopropyltrimethoxysilane is mentioned as a preferred organosilane. Gamma-mercaptopropyltrimethoxysilane is very toxic and has a very unpleasant smell. There is a need in the art for further stabilizing agents, which improve the water stability of sulphur cement products.

SUMMARY OF THE INVENTION

It has now been found that a stabilizing agent chosen from a group of organotitanates can be used to prepare sulphur cement products.

Accordingly, the present invention provides a sulphur cement pre-composition, comprising sulphur and at least an organotitanate, which organotitanate is of the general molecular formula:

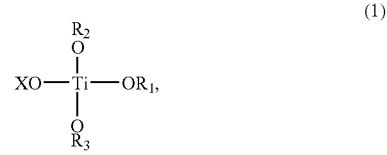

(1)

wherein
R$_1$ is C$_n$H$_{(2n)}$—S$_a$R$_4$ or C$_m$H$_{(2m+1)}$ and n is an integer in the range of from 1 to 4, m is an integer in the range of from 1 to 30 and a is an integer in the range of from 2 to 8, R$_4$ is S, H, or C$_p$H$_{(2p+1)}$ and p is an integer in the range of from 1 to 8, XO is an alkoxy or neoalkoxy group, and R$_2$ and R$_3$ are, independently, a C$_n$H$_{(2n)}$—S$_a$R$_4$, alkyl, neoalkyl, acyl or aryl group.

The invention in a further aspect provides a sulphur cement pre-composition, comprising sulphur and at least an organotitanate, which organotitanate is of the general molecular formula:

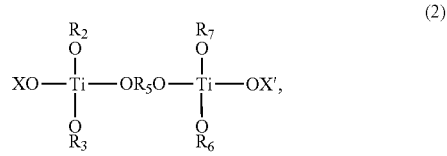

(2)

wherein
R$_5$ is C$_n$H$_{(2n)}$—S$_a$—C$_{n'}$H$_{(2n')}$ and n and n' each are, independently, an integer in the range of from 1 to 4 and a is an integer in the range of from 2 to 8, XO and X'O each are, independently, an alkoxy or neoalkoxy group, and R$_2$, R$_3$, R$_6$, and R$_7$ each are, independently, a C$_n$H$_{(2n)}$—S$_a$R$_4$, alkyl, neoalkyl, acyl or aryl group wherein R$_4$ is S, H, or C$_p$H$_{(2p+1)}$ and p is an integer in the range of from 1 to 8.

The invention in a further aspect provides a process for the preparation of a sulphur cement pre-composition according to the invention, comprising admixing sulphur with at least an organotitanate in an amount of at least 0.05 wt % based on the weight of the total composition to obtain a sulphur cement pre-composition, in which process the organotitanate is of the general molecular formula as defined hereinabove.

The invention in an even further aspect provides a process for the preparation of a sulphur cement product comprising the following steps:
(a) admixing at least sulphur, and organotitanate as defined hereinabove and a particulate inorganic material at a temperature at which sulphur is molten to obtain a molten sulphur cement product; and
(b) solidifying the molten sulphur cement product.

The invention in a yet further aspect provides a process for the preparation of sulphur cement product comprising the following steps:

(a) admixing at least a particulate inorganic material and organotitanate as defined hereinabove and allowing the organotitanate to react with the particulate inorganic material;
(b) admixing, after step (a), elemental sulphur with the particulate inorganic material at a temperature at which sulphur is liquid to obtain an admixture comprising molten sulphur and particulate inorganic material; and
(c) solidifying the admixture to obtain a sulphur cement product.

The invention in a still further aspect provides a sulphur cement product obtainable by a process for the preparation of a sulphur cement product according to the invention.

The invention in another aspect provides the use of an organotitanate as defined hereinabove as stabilizing agent in sulphur cement, sulphur mortar, sulphur concrete or sulphur-extended asphalt.

The invention in even another aspect provides the use of a sulphur cement pre-composition according to the invention in sulphur cement, sulphur mortar, sulphur concrete or sulphur-extended asphalt.

Reference herein to a sulphur cement pre-composition is to a composition, which after addition of at least one of sulphur or a particulate inorganic material forms a sulphur cement product, e.g. a sulphur cement, a sulphur mortar, sulphur concrete and sulphur-extended asphalt.

DETAILED DESCRIPTION OF THE INVENTION

The sulphur cement pre-composition according to the invention comprises sulphur and at least an organotitanate. The organotitanate may be of the general molecular formula:

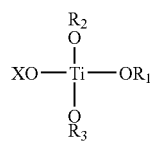

(1)

wherein $R_1$ is $C_nH_{(2n)}$—$S_aR_4$ or $C_mH_{(2m+1)}$ and n is an integer in the range of from 1 to 4, m is an integer in the range or form 1 to 30. $R_1$ is a group, which may provide suitable interaction with the sulphur. Preferably, $R_1$ is a $C_nH_{(2n)}$—$S_aR_4$ group. The organotitanate may then be referred to as a polysulphur-comprising organotitanate. The sulphur group provides the desired good interaction with sulphur and additionally it reduces the possible formation of hydrogen sulphide. If $R_1$ is a $C_nH_{(2n)}$—$S_aR_4$ group, a is an integer in the range of from 2 to 8, preferably of from 2 to 6. $R_4$ is S, H, or $C_pH_{(2p+1)}$ and p is an integer in the range of from 1 to 8, preferably $R_4$ is S.

XO is an alkoxy or neoalkoxy group.

Reference herein to a neoalkoxy group is to a group according to formula (3):

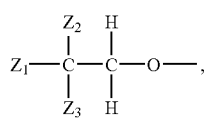

(3)

wherein:

$Z_1$, $Z_2$ and $Z_3$ are each a monovalent alkyl, alkenyl, alkynyl, aralkyl, aryl or alkaryl group having up to 20 carbon atoms or a halogen or ether substituted derivative thereof. In addition, $Z_1$, $Z_2$ or $Z_3$ may also be an oxy derivative of said groups. The various $Z_1$, $Z_2$ and $Z_3$ may each contain up to three ether, oxygen or halogen substituents, provided the total number of carbon atoms for each such Z group does not exceed 20, inclusive of the carbon atoms contained in substituent portions.

Particularly preferred examples of $Z_1$, $Z_2$ and $Z_3$ groups are alkyl having 1 to 8 carbon atoms; aralkyl having 6 to 10 carbon atoms such as benzyl; the aryl and alkaryl groups having from 6 to 10 carbon atoms including phenyl, naphthyl, tolyl, xylyl; and the halogen-substituted bromophenyl; and the allyloxy-substituted alkyl having from 4 to 20 carbon atoms and the allyloxy-substituted aryl having from 9 to 20 carbon atoms. Where $Z_3$ is an oxy derivative, the most preferred compounds are the alkoxy derivatives having from 1 to 3 carbon atoms and the phenoxy group. Suitable examples of neoalkoxy groups are (bis 2-ethenolatomethyl)propanolato and (bis 2-propenolatomethyl)butanolato. The use of neoalkoxy groups may provide an increased temperature stability of the stabilizing agent.

Neoalkyl groups are neoalkoxy groups minus the connecting oxygen.

$R_2$ and $R_3$ are, independently, a $C_nH_{(2n)}$—$S_aR_4$, alkyl, neoalkyl, acyl or aryl group. When $R_2$ and $R_3$ are alkyl or neoalkyl, $R_2O$ and $R_3O$ are alkoxy or neoalkoxy groups as defined hereinabove. In that case $R_2$ and $R_3$ are equal to X.

Preferably, $R_2$ and $R_3$ are chosen such that they are, independently, equal to $R_1$ or X. More preferably, $R_2$ and $R_3$ are equal to X as this provides the highest number of couplings between the stabilizing agent and the inorganic material.

The organotitanate may also be a polysulphur-comprising organotitanate of the general molecular formula:

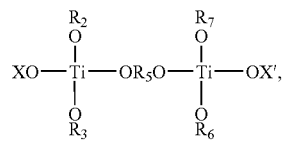

(2)

wherein:

$R_5$ is $C_nH_{(2n)}$—$S_a$—$C_{n'}H_{(2n')}$ and n and n' each are, independently, an integer in the range of from 1 to 4 and a is an integer in the range of from 2 to 8, preferably of from 2 to 6.

XO and X'O each are, independently, an alkoxy or neoalkoxy group. Preferably X'O is the same as XO.

$R_2$, $R_3$, $R_6$, and $R_7$ each are, independently, a $C_nH_{(2n)}$—$S_aR_4$, alkyl, neoalkyl, acyl or aryl group. $R_4$ is S, H, or $C_pH_{(2p+1)}$ and p is an integer in the range of from 1 to 8, preferably $R_4$ is S. When $R_2$, $R_3$, $R_6$, and $R_7$ are alkyl or neoalkyl, $R_2O$, $R_3O$, $R_6O$, and $R_7O$ are alkoxy or neoalkoxy groups as defined hereinabove. In that case $R_2$, $R_3$, $R_6$, and $R_7$ are equal to X. Preferably, $R_2$, $R_3$, $R_6$, and $R_7$ are, independently, equal to X or $C_nH_{(2n)}$—$S_aR_4$, more preferably $R_2$, $R_3$, $R_6$, and $R_7$ are equal to X as this provides the highest number of couplings between the stabilizing agent and the inorganic material.

Preferably, $R_2$, $R_3$, $R_6$, and $R_7$ are the same.

Irrespective of the organotitanate used XO and X'O each are, independently, an alkoxy or neoalkoxy group, more preferably a lower alkoxy group, even more preferably an alkoxy group with 1 to 4 carbon atoms, for example methoxy or ethoxy.

Preferably, n has the same value as n'.

Reference is made to U.S. Pat. No. 4,623,738, with respect to the preparation of organotitanates, especially organotitanates comprising neoalkoxy groups. Reference is also made to U.S. Pat. No. 4,164,428, with respect to suitable polysulphur-comprising groups.

The sulphur cement pre-composition may comprise the organotitanate in any amount desired. Preferably, the sulphur cement pre-composition comprises at least 0.05 wt % of the organotitanate based on the weight of the total composition. More preferably, the sulphur cement pre-composition comprises in the range of from 0.05 to 25 wt %, preferably, 0.5 to 10 wt %, more preferably 1 to 10 wt % of the organotitanate based on the weight of the total composition. Such sulphur cement pre-composition may for instance be advantageously produced off-site and used on-site in small volumes. The sulphur cement pre-composition may contain a concentration of organotitanate, which is higher than the concentration typically used in a process for preparing a sulphur cement product. When used on-site to prepare for instance a sulphur cement product, such a sulphur cement pre-composition may suitably be added in such amounts to an inorganic material that the need for stabilising agent is satisfied. The sulphur cement product may be completed by adding additional sulphur and other ingredients if not sufficiently present in the sulphur cement pre-composition. The use of the sulphur cement pre-composition removes the need for transporting and on-site storing of organotitanate.

In addition, the sulphur cement pre-composition according to the invention may comprise a sulphur modifier. Typically, the sulphur cement pre-composition may comprise sulphur modifiers in an amount in the range of from 0.1 to 10 wt % based on the weight of sulphur. Such modifiers are known in the art. Examples of such modifiers are aliphatic or aromatic polysulphides or compounds that form polysulphides upon reaction with sulphur. Examples of compounds that form polysulphides are naphthalene or olefinic compounds such as 5-ethylidene-2-norbornene (ENB) or 5-vinyl-2-norbornene (VNB), dicyclopentadiene, limonene or styrene.

It will be appreciated that when present the polysulphide group of the organotitanate and the sulphur may interact. However, such interactions do not effect the titanium groups of organotitanate.

The sulphur cement pre-compositions according to the invention may be used in solid or molten state, for instance to prepare a sulphur cement product.

The invention also provides a process for preparing a sulphur cement pre-composition according to the invention. In this process sulphur is admixed with at least the organotitanate in an amount of at least 0.05 wt % based on the weight of the total composition, to obtain a sulphur cement pre-composition. The organotitanate may be admixed with the sulphur by any means known in the art. The organotitanate may first be dissolved in a small amount of solvent, for example an alcohol or a hydrocarbon, in order to facilitate the admixing with the sulphur. The solvent preferably has a boiling point such that it evaporates during the admixing step.

Preferably, the sulphur and organotitanate are admixed at a temperature at which sulphur is molten. Alternatively, the obtained sulphur cement pre-composition is heated and mixed at a temperature at which the sulphur is molten. The temperature at which sulphur is molten is typically above 120° C., preferably in the range of from 120 to 150° C., more preferably in the range of from 125 to 140° C.

Mixing at temperatures at which the sulphur is molten may provide a homogeneous distribution of the organotitanate in the sulphur.

In case the sulphur and organotitanate are admixed at a temperature at which sulphur is molten or the obtained sulphur cement pre-composition is heated and mixed at a temperature at which the sulphur is molten, the obtained sulphur cement pre-composition may be cooled to a temperature at which the sulphur solidifies. The solid sulphur cement pre-composition can be easily stored or transported.

The organotitanate as defined hereinabove may suitably be used as a stabilizing agent in sulphur cement, sulphur mortar, sulphur concrete or sulphur-extended asphalt. In particular, a sulphur cement pre-composition comprising the organotitanate can suitably be used to prepare a sulphur cement product. Reference herein to a sulphur cement product is to a sulphur cement or a sulphur cement-aggregate composite.

A sulphur cement typically refers to a composition comprising sulphur or modified sulphur and a filler. Usual sulphur cement fillers are particulate inorganic materials with an average particle size in the range of from 0.1 μm to 0.1 mm. The filler content of sulphur cement may vary widely, but is typically in the range of from 1 to 50 wt %, based on the total weight of the cement.

Sulphur cement-aggregate composites generally refer to a composite comprising both sulphur cement and a particulate inorganic material aggregate. Examples of sulphur cement-aggregate composites are sulphur mortar, sulphur concrete and sulphur-extended asphalt. Mortar comprises fine aggregate, typically with particles having an average diameter between 0.1 and 5 mm, for example sand. Concrete comprises coarse aggregate, typically with particles having an average diameter between 5 and 40 mm. Sulphur-extended asphalt is asphalt, i.e. typically aggregate with a binder that contains filler and a residual hydrocarbon fraction, wherein part of the binder has been replaced by sulphur, usually modified sulphur.

In a first process for preparation of sulphur cement product according to the invention, a sulphur cement product is prepared by admixing in step (a) at least sulphur, an organotitanate as defined hereinabove and a particulate inorganic material at a temperature at which sulphur is molten to obtain a molten sulphur cement product. In step (b), after the admixing step (a), the molten sulphur cement product is allowed to solidify. Typically, solidification takes place by allowing the molten sulphur cement product to cool down to a temperature below the melt temperature of sulphur.

Preferably, the organotitanate and at least part of the sulphur admixed in step (a) are comprised in a sulphur cement pre-composition according to the invention. More preferably, a sulphur cement pre-composition according to the invention comprising a polysulphur-comprising organotitanate is admixed, even more preferably a sulphur cement pre-composition comprising a polysulphur-comprising organotitanate according to general formula (2). In addition to its function as stabilizing agent, a polysulphur-comprising organotitanate stabilizer according to general formula (2) may also provide an additional modifying effect. As a consequence less or even no modifier at all needs to be added during the preparation of the sulphur cement product.

Step (a) is carried out at a temperature at which sulphur is molten, i.e. typically above 120° C., preferably in the range of from 120 to 150° C., more preferably in the range of from 125 to 140° C. The conditions under which the particulate inorganic material is admixed with the organotitanate, preferably comprised in a sulphur cement pre-composition, are preferably such that the organotitanate, preferably comprised in a sulphur cement pre-composition, is allowed to react with the inorganic material. The reaction time is typically in the range of from 20 minutes to 3 hours, preferably of from 30 minutes to 2 hours.

Sulphur, and optionally further ingredients such as sulphur modifiers or particulate inorganic material, may be admixed with the sulphur cement pre-composition and the particulate inorganic material in step (a). Preferably, all ingredients of the sulphur cement product are admixed at a temperature at which sulphur is liquid.

The organotitanate, preferably comprised in a sulphur cement pre-composition, is admixed with the particulate inorganic material in such amounts that the molten sulphur cement product comprises organotitanate in the range of from 0.01 to 0.2 wt %, preferably of from 0.02 to 0.1 wt %, based on the weight of particulate inorganic material. If the organotitanates have reacted during the preparation of the sulphur cement pre-composition, sulphur cement pre-composition is admixed in such an amount that an equivalent number of titania groups are present.

In a second process for the preparation of sulphur cement product according to the invention, a sulphur cement product is prepared by admixing in step (a) at least a particulate inorganic material and organotitanate as defined hereinabove, and allowing the organotitanate to react with the particulate inorganic material. In step (b), after the admixing step (a), elemental sulphur is admixed with the particulate inorganic material at a temperature at which sulphur is liquid to obtain an admixture comprising molten sulphur and particulate inorganic material. In step (c) the molten sulphur cement product is allowed to solidify. In this embodiment the organotitanate is not comprised in a sulphur cement pre-composition but is admixed with the particulate inorganic material before being admixed with sulphur. The organotitanate reacts with the particulate inorganic material. The reaction time is preferably in the range of from 20 minutes to 3 hours, more preferably from 30 minutes to 2 hours. The organotitanate may be admixed as such with the particulate inorganic material, e.g. by spraying it onto the particulate inorganic material. Alternatively, the organotitanate may be dissolved in a small amount of solvent, for example an alcohol or a hydrocarbon, in order to facilitate the admixing with the particulate inorganic material. The solvent preferably has a boiling point below the temperature at which step (a) is performed in order to allow the solvent to evaporate during the admixing.

Particulate inorganic materials are admixed with the organotitanate in the processes according to the invention. In case of a process for the preparation of sulphur cement, the inorganic material is an inorganic filler. In the case the process for preparing a sulphur cement product is used for the preparation of a sulphur cement-aggregate composite, the particulate inorganic material may be filler and aggregate. The particulate inorganic material that is admixed with the organotitanate may be any particulate inorganic material known to be suitable as sulphur cement filler or aggregate. Examples of suitable particulate inorganic materials are metal carbonates, e.g. calcium carbonate, asbestos, silica, fly ash, limestone, quartz, iron oxide, alumina, titania, carbon black, gypsum, talc or mica, sand, gravel, rock or metal-silicates. Such metal silicates are for example formed upon heating heavy metal containing sludge in order to immobilise the metals. More preferably the particulate inorganic material is a calcium carbonate, silica or a silicate.

In the case that metal-silicates formed by heating sludge for heavy metal immobilisation are used as particulate inorganic material, the heat that is available in the heated sludge can advantageously be used in the preparation of the sulphur cement product according to the invention. This can for example be done by using steam that is generated during cooling of the metal-silicates for heating the sulphur or the ingredients of the process according to the invention.

What is claimed is:

1. A sulphur cement pre-composition, comprising sulphur and at least an organotitanate, which organotitanate is of the general molecular formula:

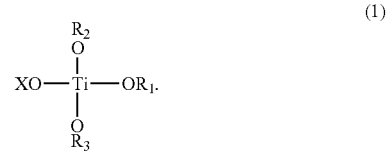

wherein $R_1$ is $C_nH_{(2n)}$—$S_aR_4$ or $C_mH_{(2m+1)}$ and n is an integer in the range of from 1 to 4, m is an integer in the range of from 1 to 30 and a is an integer in the range of from 2 to 8, $R_4$ is S, H, or $C_pH_{(2p+1)}$ and p is an integer in the range of from 1 to 8, XO is an alkoxy or neoalkoxy group, and $R_2$ and $R_3$ are, independently, a $C_nH_{(2n)}$—$S_aR_4$, alkyl, neoalkyl, acyl or aryl group.

2. A sulphur cement pre-composition according to claim 1, comprising in the range of from 0.05 to 25 wt % of organotitanate based on the weight of the total composition.

3. A process for the preparation of a sulphur cement pre-composition according to claim 2, comprising admixing sulphur with at least an organotitanate in an amount of at least 0.05 wt % based on the weight of the total composition to obtain a sulphur cement pre-composition, in which process the organotitanate is of the general molecular formula:

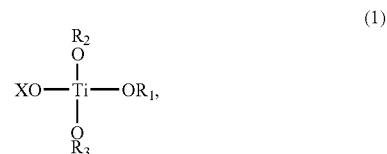

wherein $R_1$ is $C_nH_{(2n)}$—$S_aR_4$ or $C_mH_{(2m+1)}$ and n is an integer in the range of from 1 to 4, m is an integer in the range of from 1 to 30 and a is an integer in the range of from 2 to 8, $R_4$ is S, H, or $C_pH_{(2p+1)}$ and p is an integer in the range of from 1 to 8, XO is an alkoxy or neoalkoxy group, and $R_2$ and $R_3$ are, independently, a $C_nH_{(2n)}$—$S_aR_4$, alkyl, neoalkyl, acyl or aryl group.

4. A process for the preparation of a sulphur cement pre-composition according to claim 1, comprising admixing sulphur with at least an organotitanate in an amount of at least 0.05 wt % based on the weight of the total composition to obtain a sulphur cement pre-composition, in which process the organotitanate is of the general molecular formula:

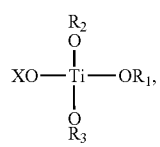

(1)

wherein
- $R_1$ is $C_nH_{(2n)}$—$S_aR_4$ or $C_mH_{(2m+1)}$ and n is an integer in the range of from 1 to 4, m is an integer in the range of from 1 to 30 and a is an integer in the range of from 2 to 8, $R_4$ is S, H, or $C_pH_{(2p+1)}$ and p is an integer in the range of from 1 to 8,
- XO is an alkoxy or neoalkoxy group, and
- $R_2$ and $R_3$ are, independently, a $C_nH_{(2n)}$—$S_aR_4$, alkyl, neoalkyl, acyl or aryl group.

5. A process for the preparation of a sulphur cement product comprising the following steps:
   (a) admixing at least sulphur, and organotitanate as defined in claim 1 and a particulate inorganic material at a temperature at which sulphur is molten to obtain a molten sulphur cement product; and
   (b) solidifying the molten sulphur cement product.

6. A sulphur cement product obtainable by a process according to claim 5.

7. A process for the preparation of a sulphur cement product comprising the following steps:
   (a) admixing at least sulphur, and organotitanate as defined in claim 1 and a particulate inorganic material at a temperature at which sulphur is molten to obtain a molten sulphur cement product; and
   (b) solidifying the molten sulphur cement product,
   wherein the organotitanate and at least part of the sulphur are admixed in the form of a sulphur cement pre-composition comprising sulfur and the organotitanate.

8. A process for the preparation of a sulphur cement product comprising the following steps:
   (a) admixing at least a particulate inorganic material and organotitanate as defined in claim 1 and allowing the organotitanate to react with the particulate inorganic material;
   (b) admixing, after step (a), elemental sulphur with the particulate inorganic material at a temperature at which sulphur is liquid to obtain an admixture comprising molten sulphur and particulate inorganic material; and
   (c) solidifying the admixture to obtain a sulphur cement product.

9. A sulphur cement pre-composition according to claim 1, comprising in the range of from 0.5 to 10 wt % of organotitanate based on the weight of the total composition.

10. A process for the preparation of a sulphur cement pre-composition according to claim 9, comprising admixing sulphur with at least an organotitanate in an amount of at least 0.05 wt % based on the weight of the total composition to obtain a sulphur cement pre-composition, in which process the organotitanate is of the general molecular formula:

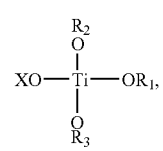

(1)

wherein
- $R_1$ is $C_nH_{(2n)}$—$S_aR_4$ or $C_mH_{(2m+1)}$ and n is an integer in the range of from 1 to 4, m is an integer in the range of from 1 to 30 and a is an integer in the range of from 2 to 8, $R_4$ is S, H, or $C_pH_{(2p+1)}$ and p is an integer in the range of from 1 to 8,
- XO is an alkoxy or neoalkoxy group, and
- $R_2$ and $R_3$ are, independently, a $C_nH_{(2n)}$—$S_aR_4$, alkyl, neoalkyl, acyl or aryl group.

11. A sulphur cement pre-composition according to claim 1, comprising in the range of from 1 to 10 wt % of organotitanate based on the weight of the total composition.

12. A sulphur cement pre-composition, comprising sulphur and at least an organotitanate, which organotitanate is of the general molecular formula:

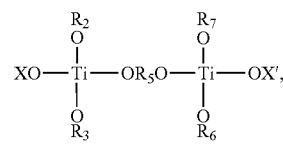

(2)

wherein
- $R_5$ is $C_nH_{(2n)}$—$S_a$—$C_nH_{(2n')}$ and n and n' each are, independently, an integer in the range of from 1 to 4 and a is an integer in the range of from 2 to 8,
- XO and X'O each are, independently, an alkoxy or neoalkoxy group, and
- $R_2$, $R_3$, $R_6$, and $R_7$ each are, independently, a $C_nH_{(2n)}$-$S_aR_4$, alkyl, neoalkyl, acyl or aryl group wherein $R_4$ is S, H, or $C_pH_{(2p+1)}$ and p is an integer in the range of from 1 to 8.

13. A sulphur cement pre-composition according to claim 12, comprising in the range of from 0.05 to 25 wt % of organotitanate based on the weight of the total composition.

14. A process for the preparation of a sulphur cement pre-composition according to claim 13, comprising admixing sulphur with at least an organotitanate in an amount of at least 0.05 wt % based on the weight of the total composition to obtain a sulphur cement pre-composition, in which process the organotitanate is of the general molecular formula:

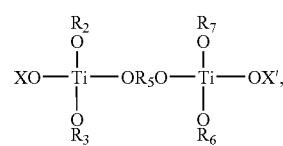

(2)

wherein
- $R_5$ is $C_nH_{(2n)}$—$S_a$—$C_nH_{(2n')}$ and n and n' each are, independently, an integer in the range of from 1 to 4 and a is an integer in the range of from 2 to 8,
- XO and X'O each are, independently, an alkoxy or neoalkoxy group, and $R_2$, $R_3$, $R_6$, and $R_7$ each are, independently, a $C_nH_{(2n)}$-$S_aR_4$, alkyl, neoalkyl, acyl or aryl group wherein $R_4$ is S, H, or $C_pH_{(2p+1)}$ and p is an integer in the range of from 1 to 8.

15. A sulphur cement pre-composition according to claim 12, comprising in the range of from 0.5 to 10 wt % of organotitanate based on the weight of the total composition.

16. A process for the preparation of a sulphur cement pre-composition according to claim 15, comprising admixing sulphur with at least an organotitanate in an amount of at least 0.05 wt % based on the weight of the total composition to obtain a sulphur cement pre-composition, in which process the organotitanate is of the general molecular formula:

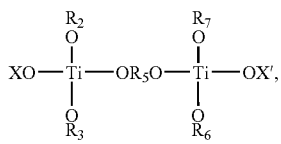

(2)

wherein $R_5$ is $C_nH_{(2n)}$—$S_a$—$C_nH_{(2n')}$ and n and n' each are, independently, an integer in the range of from 1 to 4 and a is an integer in the range of from 2 to 8, XO and X'O each are, independently, an alkoxy or neoalkoxy group, and $R_2$, $R_3$, $R_6$, and $R_7$ each are, independently, a $C_nH_{(2n)}$-$S_aR_4$, alkyl, neoalkyl, acyl or aryl group wherein $R_4$ is S, H, or $C_pH_{(2p+1)}$ and p is an integer in the range of from 1 to 8.

17. A sulphur cement pre-composition according to claim 12, comprising in the range of from 1 to 10 wt % of organotitanate based on the weight of the total composition.

18. A process for the preparation of a sulphur cement pre-composition according to claim 12, comprising admixing sulphur with at least an organotitanate in an amount of at least 0.05 wt % based on the weight of the total composition to obtain a sulphur cement pre-composition, in which process the organotitanate is of the general molecular formula:

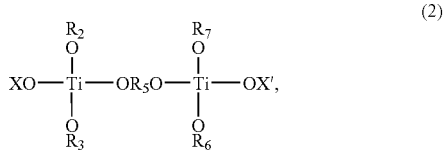

(2)

wherein $R_5$ is $C_nH_{(2n)}$—$S_a$—$C_nH_{(2n')}$ and n and n' each are, independently, an integer in the range of from 1 to 4 and a is an integer in the range of from 2 to 8, XO and X'O each are, independently, an alkoxy or neoalkoxy group, and $R_2$, $R_3$, $R_6$, and $R_7$ each are, independently, a $C_nH_{(2n)}$-$S_aR_4$, alkyl, neoalkyl, acyl or aryl group wherein $R_4$ is S, H, or $C_pH_{(2p+1)}$ and p is an integer in the range of from 1 to 8.

* * * * *